United States Patent Office 3,453,272
Patented July 1, 1969

3,453,272
7-(α,β-UNSATURATED ACYLAMINO) CEPHALO-
SPORANIC ACID AND DERIVATIVES THEREOF
Tadayoshi Takano, Hirakata, and Kiyoshi Hattori,
Ibaragi, Japan, assignors to Fujisawa Pharmaceu-
tical Co., Ltd., Higashi-ku, Osaka, Japan, a com-
pany of Japan
No Drawing. Filed Mar. 10, 1965, Ser. No. 438,757
Claims priority, application Japan, Mar. 14, 1964,
39/14,276; July 23, 1964, 39/42,128
Int. Cl. C07d 99/24; A61k 21/00
U.S. Cl. 260—243                                10 Claims

ABSTRACT OF THE DISCLOSURE

This invention relates to derivatives of 7-(α,β-unsaturated acylamine) cephalosporanic acid which have utility as untimicrobial agents.

This invention relates to 7-(α,β-unsaturated acylamine) cephalosporanic acid and derivatives thereof.

An object of this invention is to provide new compounds which are useful as the antimicrobial agents.

The compounds of this invention may be represented by the following structural Formula I:

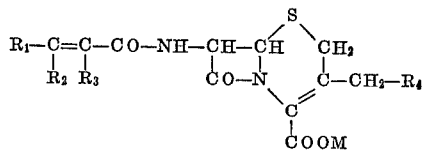

wherein $R_1$ is selected from $R_1'$ and $R_1'X$ in which X is sulfur, oxygen or carbonyl, and $R_1'$ is lower alkenyl, phenyl, phenyl having halogen or nitro, five-membered heterocyclic or said heterocyclic having nitro; $R_2$ and $R_3$ are hydrogen, halogen, lower alkyl, cycloalkenyl or phenyl; $R_4$ is acetoxy, pyridinium, aminopyridinium, imidazolinium or methylimidazolinium; M is hydrogen, a pharmaceutically acceptable non-toxic cation or an anionic charge.

In the above formula, five-membered heterocyclic of $R_1$ includes thienyl, furyl, pyrrolyl, etc., and a pharmaceutically acceptable non-toxic cation of M includes, for example, the alkali metal ion such as sodium ion or potassium ion, the ammonium radical and the organic ammonium cation such as triethyl ammonium, dicyclohexyl ammonium, diphenylenediammonium or dibenzylethylenediammonium.

The compound (I) of this invention may be prepared by reacting 7-aminocephalosporanic acid or its derivatives having the Formula II:

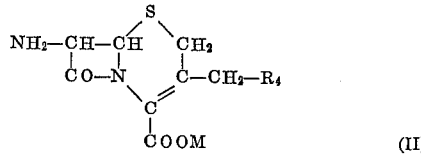

with α,β-unsaturated carboxylic acid having the Formula III:

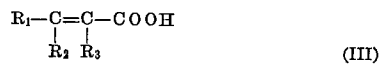

or its reactive derivative, wherein $R_{1-4}$ and M are the same as those described in Formula I.

7-aminocephalosporanic acid (7-amino-3-acetoxymethyl-3-cephem-4-carboxylic acid) in the starting material (II) is known compound in the art and can be obtained upon hydrolysis of antibiotic cephalosporin C [Biochemical Journal 79, 408–416 (1961)].

When using α,β-unsaturated carboxylic acid, the reaction is preferably carried out in the presence of the condensing agent such as dicyclohexylcarbodiimide, N-cyclohexyl - N'-morpholinoethylcarbodiimide, pentamethyleneketen-N-cyclohexylimine, N - ethyl - o - phenylisoxazolium-3'-sulfonate, phosphorus trichloride and so forth. In this case, it is considered that the reaction may mainly proceed through an active form of carboxyl radical in α,β-unsaturated carboxylic acid or of amino radical in 7-aminocephalosporanic acid.

In reactive derivatives of α,β-unsaturated carboxylic acid may be mentioned the acid halide, acid anhydride, acid amide, acid ester and so forth. Examples of the reactive derivatives of α,β-unsaturated carboxylic acid to be frequently used are the acid chloride, acid azide, mixed acid anhydride with alkylphosphoric acid or alkylcarbonic acid, acid amide with imidazole or 4-substituted imidazole, acid cyanomethyl ester, acid p-nitrophenyl ester and so forth. These reactive derivatives are suitably selected in accordance with the kinds of α,β-unsaturated carboxylic acid to be used.

The reaction is usually carried out in the presence of a solvent. In the solvent may be mentioned acetone, dioxane, acetonitrile, chloroform, ethylene chloride, tetrahydrofuran, or another organic solvents which are inert in the reaction and are used commonly. Of these solvent, the hydrophylic ones may be used with water.

Also, the reaction may be carried out in the presence of a base such as alkali metal hydrogen carbonate, trialkylamine, pyridine, etc. The reaction is carried out in almost every case under cooling or at room temperature though the temperature is not particularly limited.

After completing the reaction, the reaction product is separated according to the conventional method known in the arts.

When using the compound (II) wherein M is a pharmaceutically acceptable non-toxic cation as a starting compound, the object compound (1) wherein M is hydrogen is mainly obtained, because the dissociation of the cation tends to occur during the separation of the reaction product. Therefore, if it is desired to obtain the object compound (1) wherein M is a pharmaceutically acceptable non-toxic cation, the compound (I) wherein M is hydrogen is treated with an appropriate compound such as an sodium hydroxide, potassium hydroxide, sodium α-ethyl hexanoate, triethylamine, dicyclohexylamine, diphenylenediamine or dibenzylethylenediamine.

In addition, the compound (I) wherein $R_4$ is pyridinium, aminopyridinium, imidazolinium or methylimidazolinium may be obtained by reacting the compound (II) wherein $R_4$ is acetoxy, with pyridine, aminopyridine, imidazole or methylimidazole.

Both 7-aminocephalosporanic acid or its derivatives to be used in the reaction of this invention and the object compound (I) are comparatively unstable and tend to decompose during treatment. Therefore, it is preferable to carry out the reaction and separation under mild condition.

Thus obtained compound (I) not only demonstrates resistance to penicillinase but exhibits advantageous physiological properties and activity against a wide variety of micro-organisms.

The following examples will illustrate the types of compounds available in accordance with this invention.

In the examples, "MIC" means a minimum inhibitory concentration which is measured by the serial dilution method commonly employed in testing antimicrobial compounds, and *Escherichia coli* and *Staphylococcus aureus* are referred to *E. coli* and *St. aureus*, respectively.

EXAMPLE 1

7-cinnamamidocephalosporanic acid

To 540 mg. of 7-aminocephalosporanic acid and 130 mg. of sodium bicarbonate dissolved into 10 cc. of aqueous acetone (50%) was added 0.5 cc. of the saturated sodium bicarbonate solution. To this solution was added drop by drop 450 mg. of cinnamoyl chloride in 4 cc. of acetone under ice-cooling and stirred for 2 hours at room temperature, after which was allowed to stand overnight. The reaction mixture adjusted to pH 2.0 was extracted with ethyl acetate and the solvent was distilled off under reduced pressure. The remainder was washed with ether and recrystallized from acetone and water to obtain 370 mg. of 7-cinnamamidocephalosporanic acid as crystals having M.P. 171–173° C.

*Analysis.*—Calculated for $C_{19}H_{18}O_6N_2S$: C, 56.56; H, 4.75; N, 6.94. Found: C, 56.23; H, 4.85; N, 7.18.

MIC: *E. coli* >40γ/cc.; *St. aureus* 0.8γ/cc.

EXAMPLE 2

7-(o-nitrocinnamamido) cephalosporanic acid

To 680 mg. of 7-aminocephalosporanic acid dissolved into 0.9 cc. of triethylamine and 20 cc. of chloroform was added 10 cc. of the chloroform solution containing 550 mg. of o-nitrocinnamoyl chloride and stirred for 2 hours under ice-cooling and then for 3 hours at room temperature. To the reaction mixture was added water and after adjusting to pH 1.0, filtered. From the filtrate, chloroform was distilled off under reduced pressure and the remainder was washed with the mixture of ether and benzene to obtain 300 mg. of 7-(o-nitrocinnamamido) cephalosporanic acid as powders having M.P. 94–102° C. (dec.).

UV: $\lambda_{max.}^{80\%\ C_2H_5OH\cdot NaOH}$ 245 m$\mu$, E 462; 310 m$\mu$, E 129

MIC: *E. coli* 40γ/cc.; *St. aureus* 2.5 γ/cc.

EXAMPLE 3

7-(m-nitrocinnamamido) cephalosporanic acid 7-aminocephalosporanic acid (680 mg.) and 210 mg. of sodium bicarbonate were dissolved into 20 cc. of acetone and 10 cc. of water. To this solution was added m-nitrocinnamoyl chloride prepared from 589 mg. of m-nitrocinnamic acid and stirred for 30 minutes under ice-cooling and then for 1.5 hours at room temperature, after which was allowed to stand overnight in a cold place. The reaction mixture was filtered and the filtrate was washed with ether. Thus obtained water layer was adjusted to pH 2.0 with hydrochloric acid and extracted with ethylacetate. The extract solution was condensed and washed with ether to obtain 591 mg. of 7-(m-nitrocinnamamido) cephalosporanic acid as powders having M.P. 115–125° C. (dec.).

UV: $\lambda_{max.}^{80\%\ C_2H_5OH\cdot NaOH}$ 264.5 m$\mu$; E 875.7

MIC: *E. coli* 40γ/cc.; *St. aureus* 4γ/cc.

EXAMPLE 4

7-(p-nitrocinnamamido) cephalosporanic acid

To 500 mg. of 7-aminocephalosporanic acid in 0.7 cc. of triethylamine and 25 cc. of chloroform, was added 381 mg. of p-nitrocinnamoyl chloride under ice-cooling and stirred for 4 hours under ice-cooling, after which was allowed to stand overnight in an ice-box. To the reaction mixture were added hydrochloric acid and water, and the precipitate and the chloroform layer were separated out. Chloroform was distilled off under reduced pressure. The remainder was washed with petroleum ether to obtain 206 mg. of 7-(p-nitrocinnamamido) cephalosporanic acid as powders having M.P. 150° C. (dec.). Furthermore, the precipitate above obtained was dissolved into the sodium bicarbonate solution.

This solution was adjusted to pH 2.0 and extracted with ethyl acetate. The extract solution was condensed under reduced pressure and the remainder was dissolved into ethyl acetate and acetone. The solvent was distilled off under reduced pressure to obtain 94 mg. of the object compound.

UV: $\lambda_{max.}^{80\%\ C_2H_5OH\cdot NaOH}$ 315 m$\mu$; E 393

MIC: *E. coli* 40γ/cc.; *St. aureus* 10γ/cc.

EXAMPLE 5

7-(o-chlorocinnamamido) cephalosporanic acid

To 680 mg. of 7-aminocephalosporanic acid and 240 mg. of sodium bicarbonate in 10 cc. of acetone and 10 cc. of water, was added 2-chlorocinnamoyl chloride prepared from 2-chlorocinnamic acid and stirred for 30 minutes under ice-cooling and then 2.5 hours at room temperature, after which was allowed to stand overnight. The reaction mixture was washed with ether and after adjusting to pH 2.0 with hydrochloric acid, extracted with ethyl acetate. The extract solution was condensed under reduced pressure and thus obtained powders were recrystallized from acetone and water to obtain 486 mg. of 7-(o-chlorocinnamamido) cephalosporanic acid as crystals having M.P. 193°–194° C.

*Analysis.*—Calculated for $C_{19}H_{17}O_6N_2SCl$: C, 51.99; H, 4.36; N, 6.38; S, 7.31. Found: C, 51.98; H, 3.99; N, 6.38; S, 7.27.

UV: $\lambda_{max.}^{80\%\ C_2H_5OH\cdot NaOH}$ 275 m$\mu$, E 609; 224 m$\mu$, E 515

MIC: *E. coli* >40γ/cc.; *St. aureus* 0.5γ/cc.

EXAMPLE 6

7-(p-chlorocinnamamido) cephalosporanic acid p-Chlorocinnamic acid (328.5 mg.) was dissolved into 0.3 cc. of triethylamine and 20 cc. of acetone and cooled to 0–5° C. To this solution was added 0.17 cc. of ethyl chloroformate and stirred for 15 minutes. Thus obtained solution was cooled to −40°∼5° C. to which solution was added drop by drop 16 cc. of the aqueous solution containing 500 mg. of 7-aminocephalosporanic acid and 480 mg. of sodium bicarbonate, and stirred for 30 minutes at 0°–5° C. and then for an hour at room temperature. The reaction mixture was washed with ether and after adjusting to pH 2.0 with hydrochloric acid, extracted with ethyl acetate. The extract solution was condensed under reduced pressure and thus obtained remainder was dissolved into ethyl acetate. This ethyl acetate solution was condensed under reduced pressure to obtain 60 mg. of 7-(p-chlorocinnamamido) cephalosporanic acid as powders having M.P. 178°–185° C. (dec.).

UV: $\lambda_{max.}^{80\%\ C_2H_5OH\cdot NaOH}$ 277.5 m$\mu$; E 991

NUC: *E. coli* >40γ/cc.; *St. aureus* 10γ/cc.

Example 7

7-(β-chlorocinnamamido) cephalosporanic acid 7-aminocephalosporanic acid (540 mg.) and 400 mg. of β-chlorocinnamoyl chloride dissolved into 0.6 cc. of triethylamine and 25 cc. of chloroform, were stirred for 3 hours under cooling and allowed to stand overnight. The reaction mixture was adjusted to pH 2.0 with 5% hydrochloric acid and filtered. From the chloroform layer, chloroform was distilled off under reduced pressure. The remainder was washed with ether to obtain 417 mg. of 7-(β-chlorocinnamamido) cephalosporanic acid as powders having M.P. 125°–130° C. (dec.).

UV: $\lambda_{max.}^{80\%\ C_2H_5OH\cdot NaOH}$ 264 m$\mu$; E 297

MIC: *E. coli* 40γ/cc.; *St. aureus* 10γ/cc.

EXAMPLE 8

7-(trans-α,β-dibromocinnamamido) cephalosporanic acid 7-aminocephalosporanic acid (500 mg.) and 600 mg. of trans-α,β-dibromocinnamoyl chloride dissolved into 0.6 cc. of triethylamine and 25 cc. of chloroform, were stirred for 2 hours under ice-cooling and for an hour at room temperature. The reaction mixture was adjusted to pH 2.0 with hydrochloric acid and extracted with chloroform. The extract solution was condensed under reduced pressure and the condensed solution was washed with ether to obtain 883 mg. of 7-(trans-$\alpha,\beta$-dibromocinnamamido) cephalosporanic acid as powders having M.P. 98°–106° C. (dec.).

UV: $\lambda_{max.}^{80\% \ C_2H_5OH}$ 242 m$\mu$; E 268

MIC: *E. coli* 40$\gamma$/cc.; *St. aureus* 1.25$\gamma$/cc.

EXAMPLE 9

7-[2-(1-cyclohexenyl)-p-nitrocinnamamido] cephalosporanic acid 7-aminocephalosporanic acid (680 mg.) was dissolved into 0.8 cc. of triethylamine and 20 cc. of chloroform. To this solution was added 10 cc. of chloroform solution containing 2-(1-cyclohexenyl)-p-nitrocinnamoyl chloride prepared from 683 mg. of 2-(1-cyclohexenyl)-p-nitrocinnamic acid at 0°–5° C. and stirred for 30 minutes at 0°–5° C. and then 3 hours at room temperature, after which was allowed to stand overnight.

The reaction mixture was adjusted to pH 2.0 with 5% hydrochloric acid and from the chloroform layer, chloroform was distilled off. Thus obtained remainder was washed with ether to obtain 30.5 mg. of 7-[2-(-1-cyclohexenyl)-p-nitrocinnamamido] cephalosporanic acid as powders having M.P. 64°–84° C. (dec.).

UV: $\lambda_{max.}^{80\% \ C_2H_5OH \cdot NaOH}$ 263 m$\mu$; E 156

MIC: *E. coli* 40$\gamma$/cc.; *St. aureus* 40$\gamma$/cc.

EXAMPLE 10

7-(2-phenyl-o-nitrocinnamamido) cephalosporanic acid 2-phenyl-o-nitrocinnamoyl chloride prepared from 510 mg. of 2-phenyl-o-nitrocinnamic acid was dissolved into 5 cc. of chloroform. To this solution was added drop by drop 500 mg. of 7-aminocephalosporanic acid in 0.5 cc. of triethylamine and 20 cc. of chloroform and stirred for 30 minutes under ice-cooling and then for 3 hours at room temperature, after which was allowed to stand overnight. The reaction mixture was adjusted to pH 1.0 with hydrochloric acid and the chloroform layer was condensed under reduced pressure. The remainder was washed with ether and petroleum ether and dissolved into acetone, after which this acetone solution was filtered and the filtrate was condensed under reduced pressure. The remainder was washed with ether to obtain 137 mg. of 7-(2-phenyl-o-nitrocinnamamido) cephalosporanic acid as powders.

MIC: *E. coli* >40$\gamma$/cc.; *St. aureus* 20$\gamma$/cc.

EXAMPLE 11

7-(2,3-diphenylacrylamido) cephalosporanic acid

To 680 mg. of 7-aminocephalosporanic acid in 0.7 cc. of triethylamine and 35 cc. of chloroform was added drop by drop the chloroform solution of 726 mg. of 2,3-diphenylacrylolyl chloride under ice-cooling and stirred under ice-cooling and then for 2 hours at room temperature, after which was allowed to stand overnight in an ice-box. The reaction mixture was shaken with water, adjusted to pH 2.0 and the chloroform layer was condensed under reduced pressure. The remainder was washed with ether and petroleum ether to obtain 510 mg. of 7-(2,3-diphenylacrylamido) cephalosporanic acid as powders having M.P. 111–114° C. (dec.).

UV: $\lambda_{max.}^{80\% \ C_2H_5OH \cdot NaOH}$ 285 m$\mu$; E 396

MIC: *E. coli* >40$\gamma$/cc.; *St. aureus* 2.5$\gamma$/cc.

PPC: Rf 0.92 (butanol:pyridine:water=1:1:1, by ascending method).

EXAMPLE 12

7-[3-(2-thienyl) acrylamido] cephalosporanic acid

The chloroform solution of 540 mg. of 7-aminocephalosporanic acid, 300 mg. of triethylamine and 480 mg. of 3-(2-thienyl) acryloyl chloride was stirred for 3 hours under ice-cooling. To the reaction mixture was added sulfuric acid and chloroform was distilled off from the chloroform layer under reduced pressure. The remainder was washed with ether and then dissolved into acetone. To this acetone solution was added water to produce the precipitate, which was recrystallized from aqueous acetone containing ethanol to obtain 7-[3-(2-thienyl) acrylamido] cephalosporanic acid as powders having M.P. 154–156° C. (dec.).

UV: $\lambda_{max.}^{80\% \ C_2H_5OH \cdot NaOH}$ 301 m$\mu$; E 501

MIC: *E. coli* >40$\gamma$/cc.; *St. aureus* 0.5$\gamma$/cc.

EXAMPLE 13

7-[2-methyl-3-(2-thienyl) acrylamido] cephalosporanic acid

To the chloroform solution of 390 mg. of 7-aminocephalosporanic acid and 0.5 cc. of triethylamine was added 410 mg. of 2-methyl-3-(2-thienyl) acryloyl chloride under ice-cooling and stirred for 2 hours under ice-cooling. To the reaction mixture were added water and hydrochloric acid and the chloroform layer was condensed under reduced pressure. The remainder was recrystallized from acetone and water to obtain 166 mg. of 7-[2-methyl-3-(2-thienyl) acrylamido] cephalosporanic acid as crystals having decomposing P. 145–148° C.

UV: $\lambda_{max.}^{C_2H_5OH}$ 300 m$\mu$; E 385.5

PPC: Rf 0.74 (butanol:ethanol:water=4:1:5, by upper layer, ascending method). Rf 0.18 (butanol:pyridine:water=1:1:1, by ascending method).

MIC: *E. coli* >40$\gamma$/cc.; *St. aureus* 1.25$\gamma$/cc.

EXAMPLE 14

7-[2-phenyl-3-(2-thienyl) acrylamido] cephalosporanic acid

To the chloroform solution of 680 mg. of cephalosporanic acid and 0.5 cc. of triethyl amine, was added 630 mg. of 2-phenyl-3-(2-thienyl) acryloyl chloride under ice-cooling and stirred for 2 hours under ice-cooling, after which was allowed to stand overnight.

The reaction mixture was adjusted to pH 2.0 with hydrochloric acid and the chloroform layer was condensed under reduced pressure. The remainder was washed with ether and dissolved into benzene. To this solution was added petroleum ether to obtain 750 mg. of 7-[2-phenyl-3-(2-thienyl) acrylamido] cephalosporanic acid as powders having M.P. 95–98° C. (dec.).

UV: $\lambda_{max.}^{80\% \ C_2H_5OH \cdot NaOH}$ 311 m$\mu$; E 379

MIC: *E. coli* >40$\gamma$/cc.; *St. aureus* 2.5$\gamma$/cc.

EXAMPLE 15

7-[3-(2-furyl) acrylamido] cephalosporanic acid

To 540 mg. of 7-aminocephalosporanic acid and 400 mg. of triethylamine in 20 cc. of chloroform was added 490 mg. of 3-(2-furyl) acryloyl chloride under ice-cooling and stirred under ice-cooling. To the reaction mixture was added dil. sulfuric acid, after which the chloroform layer was separated out and condensed under reduced pressure. To the remainder was added ether to obtain the precipitate, which was dissolved in the mixture of acetone and ethanol. To this solution was further added water and allowed to stand overnight in an ice-box to obtain 180 mg. of 7-[3-(2-furyl) acrylamido] cephalosporanic acid as powders discoloring at 170° C.

UV: $\lambda_{max.}^{80\% \ C_2H_5OH \cdot NaOH}$ 301 m$\mu$; E 237.7

MIC: *E. coli* >40γ/cc.; *St. aureus* 10γ/cc.

EXAMPLE 16

7-[3-(5-nitro-2-furyl) acrylamido] cephalosporanic acid

To 540 mg. of 7-aminocephalosporanic acid and 130 mg. of sodium bicarbonate dissolved into 10 cc. of aqueous acetone (50%), was added drop by drop 480 mg. of 3-(5-nitro-2-furyl) acryloyl chloride in 4 cc. of acetone under ice-cooling and stirred for 1.5 hours, after which was allowed to stand overnight at room temperature. The reaction mixture was condensed under reduced pressure and the remaining solution was adjusted to pH 3.3 with hydrochloric acid. The precipitated crystals were collected by filtration and dissolved into acetone. To this acetone solution was added water and allowed to stand in an ice-box to obtain 225 mg. of 7-[3-(5-nitro-2-furyl) acrylamido] cephalosporanic acid as crystals having decomposing P. 150° C.

*Analysis.*—Calculated for $C_{17}H_{15}O_9N_3 \cdot H_2O$: C, 44.84; H, 3.76; N, 9.23. Found: C, 44.52; H, 3.94; N, 8.71.

UV: $\lambda_{max.}^{C_2H_5OH}$ 242 m$\mu$, E 4.33.6;
270 m$\mu$, E 372; 350 m$\mu$, E 402

PPC: Rf 0.51 (butanol:ethanol:water=4:1:5, by upper layer, ascending method).

MIC: *E. coli* 40γ/cc.; *St. aureus* 5.0γ/cc.

EXAMPLE 17

7-[2-phenyl-3-(2-furyl) acrylamido] cephalosporanic acid

To the chloroform solution of 600 mg. of 7-aminocephalosporanic acid and 0.8 cc. of triethylamine was added drop by drop 580 mg. of 2-phenyl-3-(2-furyl) acryloyl chloride under ice-cooling and after stirring for 4 hours under ice-cooling, allowed to stand overnight. The reaction mixture was adjusted to pH 2.0 with hydrochloric acid, after which the chloroform layer was separated out and chloroform distilled off under reduced pressure. The remainder was dissolved into ether and then to this solution was added petroleum ether to obtain 764 mg. of 7-[2-phenyl-3-(2-furyl) acrylamido] cephalosporanic acid as powders having M.P. 116–119° C. (dec.).

UV: $\lambda_{max.}^{80\% \ C_2H_5OH \cdot NaOH}$ 316 m$\mu$; E 466

PPC: Rf 0.77 (butanol:ethanol:water=4:1:5, by upper layer, ascending method). Rf 0.90 (butanol:pyridine:water=1:1:1, by ascending method).

MIC: *E. coli* >40γ/cc.; *St. aureus* 5γ/cc.

EXAMPLE 18

7-[2-(1-cyclohexenyl)-3-(2-furyl) acrylamido] cephalosporanic acid 7-aminocephalosporanic acid (272 mg.) was dissolved into 0.25 cc. and 20 cc. of chloroform. To this solution was added 2-(1-cyclohexenyl)-3-(2-furyl) acryloyl chloride prepared from 218 mg. of 2-(1-cyclohexenyl)-3-(2-furyl) acrylic acid and stirred for an hour under ice-cooling and for 5 hours at room temperature, after which was allowed to stand overnight. The reaction mixture was adjusted to pH 1.0 and the chloroform layer was condensed under reduced pressure. The remainder was washed with ether and petroleum ether to obtain 136 mg. of 7-[2-(1-cyclohexenyl) - 3 - (2-furyl) acrylamido] cephalosporanic acid as powders having M.P. 98–104° C. (dec.).

UV: $\lambda_{max.}^{80\% \ C_2H_5OH \cdot NaOH}$ 310 m$\mu$; E 414.6

MIC: *E. coli* >40γ/cc.; *St. aureus* 2γ/cc.

EXAMPLE 19

7-[2-(1-cyclohexenyl)-3-(2-thienyl) acrylamido] cephalosporanic acid 7-aminocephalosporanic acid (540 mg.) was dissolved into 0.6 cc. of triethylamine and 20 cc. of chloroform. To this solution was added 5 cc. of the chloroform solution containing 2-(1-cyclohexenyl) - 3 - (2-thienyl) acryloyl chloride prepared form 2-(1-cyclohexenyl)-3-(2-thienyl) acrylic acid and stirred for 30 minutes under ice-cooling and then for 2 hours at room temperature, after which was allowed to stand overnight in an ice-box. The reaction mixture was adjusted to pH 2.0 with hydrochloric acid and then chloroform layer separated was condensed under reduced pressure. The remainder was washed with ether and petroleum ether to obtain 507 mg. of 7-[2-(1-cyclohexenyl)-3-(2-thienyl) acrylamido] cephalosporanic acid.

UV: $\lambda_{max.}^{80\% \ C_2H_5OH \cdot NaOH}$ 314 m$\mu$; E 243

MIC: *E. coli* >40γ/cc.; *St. aureus* 40γ/cc.

EXAMPLE 20

7-(3-benzoylacrylamido) cephalosporanic acid 3-benzoylacrylic acid (450 mg.) was dissolved into 2.5 cc. of tetrahydrofuran solution of dicyclohexylcarbodiimide (0.2 g./cc.) and 20 cc. of tetrahydrofuran and stirred at room temperature. To this solution were added 680 mg. of 7-aminocephalosporanic acid and 220 mg. of sodium bicarbonate in 5 cc. of tetrahydrofuran and 10 cc. of water and after stirring for 10 hours at room temperature, allowed to stand for one day. The reaction mixture was filtered and the filtrate and adjusted to pH 8 with sodium bicarbonate solution, after which tetrahydrofuran was distilled off. The remaining solution was filtered and after adjusting to pH 1.0 with hydrochloric acid, the filtrate was extracted with ethyl acetate. From the extract solution, ethyl acetate was distilled off under reduced pressure to obtain 326 mg. of 7-(3-benzolyacrylamido) cephalosporanic acid as powders having M.P. 96–120° C. (dec.).

UV: $\lambda_{max.}^{80\% \ C_2H_5OH \cdot NaOH}$ 246 m$\mu$; E 316

MIC: *E. coli* >40γ/cc.; *St. aureus* 20γ/cc.

EXAMPLE 21

7-[3-(m-nitrobenzoyl) acrylamido] cephalosporanic acid 7-aminocephalosporanic acid (400 mg.), 300 mg. of 3-(m-nitrobenzoyl) acrylic acid and 315 mg. of dicyclohexylcarbodiimide were dissolved into 1 cc. of triethylamine and 25 cc. of chloroform and after stirring for 4 hours at room temperature, allowed to stand for two days. To the reaction mixture condensed to half volume was added sodium bicarbonate solution and washed with ethylacetate. The water layer was adjusted to pH 2.5 and extracted with ethylacetate. The extract solution was condensed under reduced pressure and thus obtained remaining solution was washed with ether to obtain 104 mg. of 7-[3-(m-nitrobenzoyl) acrylamido] cephalosporanic acid as powders having M.P. 180° C. (dec.).

UV: $\lambda_{max.}^{80\% \ C_2H_5OH \cdot NaOH}$ 260 m$\mu$; E 335

MIC: *E. coli* >γ40/cc.; *St. aureus* 40γ/cc.

EXAMPLE 22

7-(3-chloro-3-benzoylacrylamido) cephalosporanic acid 3-chloro-3-benzoylacrylic acid (420 mg.) was dissolved into 2 cc. of tetrahydrofuran solution of dicyclohexylcarbodiimide (0.2 g./cc.) and 20 cc. of tetrahydrofuran and stirred at room temperature. To this solution were added 540 mg. of 7-aminocephalosporanic acid and 180 mg. of sodium bicarbonate in 5 cc. of tetrahydrofuran and 15 cc. of water and stirred for 5 hours at room temperature, after which was allowed to stand for one day. The reaction mixture was filtered and from the filtrate, tetrahydrofuran was distilled off. The remainder dissolved into water, was adjusted pH 7.5 with sodium bicarbonate solution and filtered. The filtrate was adjusted to pH 1.0 with hydrochloric acid and extracted with ethyl acetate. From the extract solution, ethyl acetate was distilled off and thus obtained remainder was washed with ether and petroleum ether to obtain 110 mg. of 7-(3-chloro-3-benzoylacrylamido) cephalosporanic acid having M.P. 115–120° C. (dec.).

UV: $\lambda_{max.}^{80\% \ C_2H_5OH \cdot NaOH}$ 254 m$\mu$; E 315

MIC: *E. coli* >40$\gamma$/cc.; *St. aureus* 5$\gamma$/cc.

EXAMPLE 23

7-(3-phenoxycrotonamido) cephalosporanic acid 3-phenoxycrotonic acid (443 mg.) was dissolved into 2 cc. of thionylchloride and stirred for 2 hours at 60° C. After thionylchloride was distilled off under reduced pressure, the remainder was dissolved into 5 cc. of acetone and added drop by drop to 682 mg. of 7-aminocephalosporanic acid and 220 mg. of sodium bicarbonate in 10 cc. of water and 10 cc. of acetone in 15 minutes at 0°–5° C., after which the reaction mixture was stirred for 30 minutes at 0°–5° C. and then 2 hours at room temperature. The reaction mixture was washed with ether and after adjusting to pH 1.0 with 5% hydrochloric acid, extracted with 50 cc. of ethyl acetate twice. From the extract solution, ethyl acetate was distilled off under reduced pressure. The remainder was dissolved into acetone and filtered.

Acetone was distilled off under reduced pressure from the filtrate and the remainder was washed with petroleum ether to obtain 313 mg. of 7-(3-phenoxycrotonamido) cephalosporanic acid as powders having M.P. 77° C. (dec.).

UV: $\lambda_{max.}^{80\% \ C_2H_5OH \cdot NaOH}$ 260 m$\mu$; E 243

MIC: *E. coli* >40$\gamma$/cc.; *St. aureus* 1$\gamma$/cc.

EXAMPLE 24

7-(2-chloro-3-phenylthioacrylamido) cephalosporanic acid 2-chloro-3-phenylthioacrylic acid (472 mg.) was dissolved into 2.2 cc. of tetrahydrofuran solution of dicyclohexylcarbodiimide, 15 cc. of chloroform and 2 cc. of tetrahydrofuran and stirred for 30 minutes. To 540 mg. of 7-aminocephalosporanic acid and 202 mg. of triethylamine in 15 cc. of chloroform was added the solution above prepared and after stirring for 6 hours at room temperature, allowed to stand overnight. To this reaction mixture was further added 0.5 cc. of dicyclohexylcarbodiimide and stirred for 4 hours, after which was filtered. To the filtrate was added water and centrifuged. The water layer was adjusted to pH 2.0 with hydrochloric acid and extracted with ethyl acetate, which was distilled off under reduced pressure. The remainder was dissolved into acetone and filtered. From the filtrate, acetone was distilled off and thus obtained remainder was washed with ether to obtain 109 mg. of 7-(2-chloro-3-phenylthioacrylamido) cephalosporanic acid as powders having M.P. 198–208° C. (dec.).

UV: $\lambda_{max.}^{80\% \ C_2H_5OH \cdot NaOH}$ 249 m$\mu$; E 317.6

MIC: *E. coli* >40$\gamma$/cc.; *St. aureus* 20$\gamma$/cc.

EXAMPLE 25

7-(3-phenylthiocrotonamido) cephalosporanic acid

To 321 mg. of 3-phenylthiocrotonic acid dissolved into 0.3 cc. of triethylamine and 15 cc. of acetone was added 0.17 cc. of ethyl chloroformate at 0–15° C. To this solution of 7-aminocephalosporanic acid cooled —40~—50° C. was added drop by drop 16 cc. of 3% sodium bicarbonate solution in 5 minutes, after which was stirred for 30 minutes at 0–5° C. and then for an hour at room temperature. The reaction mixture was washed with 50 cc. of ether twice and after adjusting to pH 1.0 with 5% hydrochloric acid, extracted with 50 cc. of ethyl acetate twice. Ethyl acetate was distilled off and the remainder was dissolved into acetone, after which was filtered. From the filtrate, acetone was distilled off under reduced pressure and the remainder was washed with petroleum ether to obtain 7-(3-phenylthiocrotonamido) cephalosporanic acid as powders having M.P. 75–84° C. (dec.).

UV: $\lambda_{max.}^{80\% \ C_2H_5OH \cdot NaOH}$ 267 m$\mu$; E 381

MIC: *E. coli* >40$\gamma$/cc.; *St. aureus* 1.25$\gamma$/cc.

EXAMPLE 26

7-[3-(2-thienylthio) crotonamido] cephalosporanic acid

3(2-thienylthio) crotonic acid (360 mg.) was dissolved into 15 cc. of acetone and 0.3 cc. of triethylamine and cooled to 0°–5° C. To this solution was added 0.17 cc. of ethyl chloroformate and stirred for 15 minutes. This solution was cooled to —40~—50° C. and added drop by drop to 16 cc. of 3% sodium bicarbonate solution containing 500 mg. of 7-aminocephalosporanic acid in 15 minutes, after which was stirred for 30 minutes at 0–5° C. and then for an hour at room temperature. The reaction mixture was washed with 50 cc. of ether twice and after adjusting to pH 1.0 with 5% hydrochloric acid further extracted with 50 cc. of ethyl acetate twice. Ethyl acetate was distilled off and the remainder was dissolved into acetone, after which filtered. From the filtrate, acetone was distilled off under reduced pressure and thus obtained remainder was washed with petroleum ether to obtain 139 mg. of 7-[3-(2-thienylthio) crotonamido] cephalosporanic acid as powders having M.P. 75–89° C.

UV: $\lambda_{max.}^{80\% \ C_2H_5OH \cdot NaOH}$ 250 m$\mu$; E 406

MIC: *E. coli* >40$\gamma$/cc.; *St. aureus* 1$\gamma$/cc.

EXAMPLE 27

7-(2,4-hexadienamido) cephalosporanic acid

To 680 mg. of 7-aminocephalosporanic acid in 0.7 cc. of triethylamine and 30 cc. of chloroform, was added 2,4-hexadienyl chloride prepared from 336 mg. of 2,4-hexadienic acid and stirred for 30 minutes under ice-cooling and then for 2.5 hours at room temperature, after which was allowed to stand overnight in a cold place. The reaction mixture was adjusted to pH 2.0 and extracted with chloroform. The extract solution was condensed under reduced pressure and the remainder was washed with ether to obtain 7-(2,4-hexadienamido) cephalosporanic acid as powders having M.P. 146–158° C. (dec.).

UV: $\lambda_{max.}^{80\% \ C_2H_5OH \cdot NaOH}$ 259 m$\mu$; E 492

MIC: *E. coli* >40$\gamma$/cc.; *St. aureus* 10$\gamma$/cc.

EXAMPLE 28

7-cinnamamido-3-pyridiniummethyl-decephalosporanic acid inner salt

The acetone solution of 300 mg. of 7-cinnamamidocephalosporanic acid obtained in Example 1 was dissolved into pyridine and acetone and allowed to stand for 30 hours at 37–40° C. in nitrogen gas current while shaking 3 or 4 times. After the reaction was over, the reaction mixture was treated with ethyl acetate twice and the water layer was condensed under reduced pressure. The residue dissolved into water was purified through the column packed with an anion exchange resin (Doewex-1). The elute was solidified by freeze-drying to obtain 170 mg. of 7-cinnamamido - 3 - pyridiniummethyl-decephalosporanic acid inner salt having M.P. 190–192° C. (dec.).

UV: $\lambda_{max.}^{H_2O}$ 280 m$\mu$; E 418

EXAMPLE 29

7-cinnamamido-3-(2-aminopyridinium) methyl-decephalosporanic acid inner salt

The substance (70 mg.) obtained in Example 1 and 2-aminopyridine were treated in the same way as described in Example 28 to obtain 30 mg. of 7-cinnamamido-3-(2-aminopyridinium) methyl-decephalosporanic acid inner salt having M.P. 160°–163° C. (dec.).

UV: $\lambda_{max.}^{H_2O}$ 224 mμ, E 400; 236 mμ, E 370; 284 mμ, E 400

MIC: *E. coli* >40γ/cc.; *St. aureus* 0.25γ/cc.

EXAMPLE 30

Dicyclohexylamine salt of 7-cinnamamido-cephalosporanic acid

To the aqueous solution of the substance obtained in Example 1 was added drop by drop the acetone solution of dicyclohexylamine at room temperature under vigorous stirring and allowed to stand in an ice-box to obtain dicyclohexylamine salt of 7-cinnamamidocephalosporanic acid having M.P. 201°–203° C. (dec.).

UV: $\lambda_{max.}^{95\% C_2H_5OH}$ 232 mμ, E 353; 274 mμ, E 534

EXAMPLE 31

Dibenzylethylenediamine salt of 7-cinnamamido-cephalosporanic acid

The substance obtained in Example 1 and dibenzylethylenediamine were treated in the same way as described in Example 30 to obtain dibenzylethylenediamine salt of 7-cinnamamidocephalosporanic acid having M.P. 174–176° C. (dec.).

MIC: *E. coli* >40γ/cc.; *St. aureus* 2γ/cc.

EXAMPLE 32

Sodium salt of 7-cinnamamidocephalosporanic acid

The substance obtained in Example 1 and sodium bicarbonate were treated in the same way as described in Example 30 to obtain sodium salt of 7-cinnamamidocephalosporanic acid having M.P. 182°–200° C. (dec.).

UV: $\lambda_{max.}^{95\% C_2H_5OH}$ 223.5 mμ, E 421; 275 mμ, E 677

EXAMPLE 33

Dicyclohexylamine salt of 7-(2-phenyl-o-nitrocinnamamido) cephalosporanic acid

The substance obtained in Example 10 and dicyclohexylamine were treated in the same way as described in Example 30 to obtain dicyclohexylamine salt of 7-(2-phenyl - o - nitrocinnamamido) cephalosporanic acid as powders having M.P. 123–131° C. (dec.).

UV: $\lambda_{inf.}^{80\% C_2H_5OH\cdot NaOH}$ 242 mμ; E 347

MIC: *E. coli* >40γ/cc.; *St. aureus* 20γ/cc.

We claim:
1. 7-[3-(2-thienyl) acrylamido] cephalosporanic acid.
2. 7-[2-methyl-3-(2-thienyl) acrylamido] cephalosporanic acid.
3. 7-[2-phenyl-3-(2-thienyl) acrylamido] cephalosporic acid.
4. 7-[3-(2-furyl) acrylamido] cephalosporanic acid.
5. 7-[3-(5-nitro-2-furyl) acrylamido] cephalsporanic acid.
6. 7-[2-phenyl-3-(2-furyl) acrylamido] cephalosporanic acid.
7. 7-[2-(1-cyclohexenyl)-3-(2-furyl) acrylamido] cephalosporanic acid.
8. 7-[2-(1-cyclohexenyl) - 3 - (2-thienyl) acrylamido] cephalosporanic acid.
9. 7-[3-(2-thienylthio) crotonamido] cephalosporanic acid.
10. A compound having the general formula

$$R_1-\underset{\underset{R_3}{|}}{\overset{\overset{R_2}{|}}{C}}=C\text{ }CONH-CH-CH\diagup\overset{S}{\diagdown}CH_3$$
(structural formula with cephalosporanic acid core, $\text{CO}-\text{N}$, $\text{C}-\text{CH}_2-R_4$, $\text{COOM}$)

wherein $R_1$ is thienyl, thienylthio, furyl or nitrofuryl; $R_2$ is hydrogen or lower alkenyl; $R_3$ is hydrogen, lower alkyl, phenyl or cyclohexenyl; $R_4$ is acetoxy, pyridinium, aminopyridinium, imidazolinium or methylimidazolinium; M is hydrogen, an alkali metal, dicyclohexylammonium or an anionic charge.

References Cited

UNITED STATES PATENTS 3,236,841  2/1966  Kuehl et al.

NICHOLAS S. RIZZO, *Primary Examiner.*

U.S. Cl. X.R.

424—246